(12) United States Patent
Bunton et al.

(10) Patent No.: US 6,374,282 B1
(45) Date of Patent: Apr. 16, 2002

(54) METHOD AND APPARATUS FOR TRACKING MULTI-THREADED SYSTEM AREA NETWORK (SAN) TRAFFIC

(75) Inventors: William P. Bunton, Pflugerville; David A. Brown, Austin, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/143,272

(22) Filed: Aug. 28, 1998

(51) Int. Cl.[7] .................................................. G06F 9/00
(52) U.S. Cl. ........................................ 709/101; 709/229
(58) Field of Search ................................. 709/100, 101, 709/102, 104, 225, 226, 227, 228, 229

(56) References Cited

U.S. PATENT DOCUMENTS

| | | | |
|---|---|---|---|
| 5,208,810 A | 5/1993 | Park ............................ | 370/94.1 |
| 5,268,900 A | 12/1993 | Hluchyj et al. ............. | 370/94.1 |
| 5,357,563 A | * 10/1994 | Hamilton et al. ......... | 379/91.01 |
| 5,557,751 A | 9/1996 | Banman et al. ............. | 395/250 |
| 5,574,849 A | 11/1996 | Sonnier et al. ........... | 395/182.1 |
| 5,675,579 A | 10/1997 | Watson et al. .............. | 370/248 |
| 5,682,142 A | * 10/1997 | Loosmore et al. ........ | 340/572.1 |
| 5,694,121 A | 12/1997 | Karuse et al. ............ | 340/825.5 |
| 5,710,549 A | 1/1998 | Horst et al. ............... | 340/825.5 |
| 5,867,501 A | 2/1999 | Horst et al. ................ | 370/474 |
| 5,898,154 A | * 4/1999 | Rosen ......................... | 235/379 |
| 5,933,625 A | * 8/1999 | Sugiyama .................... | 713/503 |
| 6,122,625 A | * 9/2000 | Rosen ........................... | 705/65 |
| 6,253,027 B1 | * 6/2001 | Weber et al. ............... | 380/287 |

* cited by examiner

Primary Examiner—Majid A. Banankhah
(74) Attorney, Agent, or Firm—Oppenheimer, Wolff & Donnelly

(57) ABSTRACT

An apparatus and method for multi-threaded transaction status management tracks elapsed time from the receipt of multiple independent transaction requests utilizing a unique transaction number included in the descriptor of a longer than a predetermined time are invalidated. The transaction number is also used as an index to stored authentication information and the transaction number is included in a response header and is used to access the stored information to authenticate the response.

4 Claims, 11 Drawing Sheets

Generic Request Transmit Descriptor

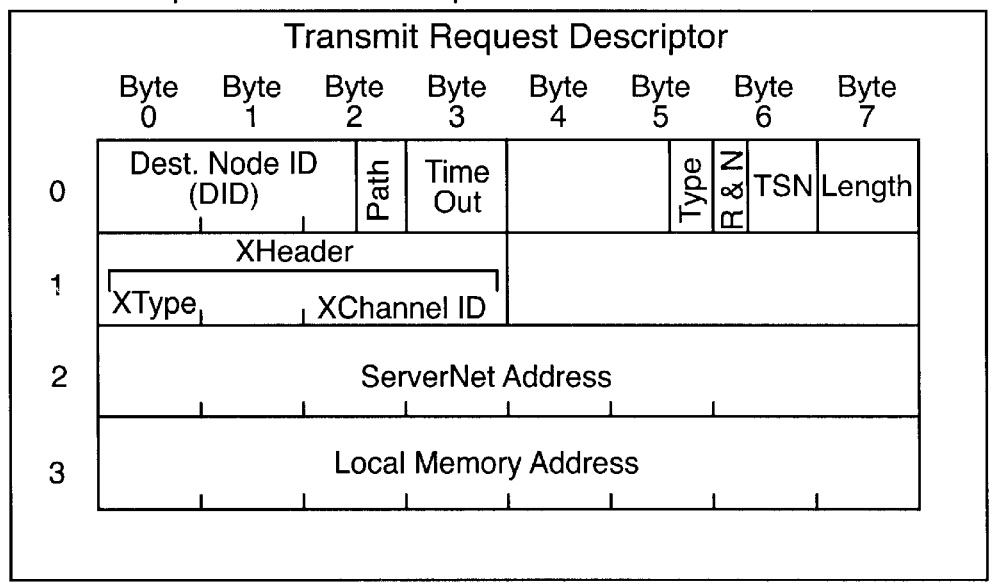

FIG. 8

TxPLP to TLP Interface Signals

| Name | Source | Width | Function |
| --- | --- | --- | --- |
| XB_Data_Q | TxBuff | 64 | This bus transfers packet descriptors from the transmit buffer to the transmit packet layer protocol and transaction layer protocol. |
| XP_HdrVal_Q | TxPLP | 1 | This strobe is driven to indicate that the header DW of a request descriptor is on the bus. |
| XP_EHdrVal_Q | TxPLP | 1 | This strobe is driven to indicate that the extended header of a request descriptor is available on the bus. |
| XP_LAddrVal_Q | TxPLP | 1 | This strobe is drive to indicate that the local memory address DW is available on the bus. |
| XP_SentTPG_Q | TxPLP | 1 | This strobe is driven to indicate that the TxPLP has completed transmitting the request packet by sending a This Packet Good (TPG) to complete the packet. |
| XP_SentTPB_Q | TxPLP | 1 | This strobe is driven to indicate that the TxPLP has completed transmitting the request packet by sending a This Packet Bad (TPB) to complete the packet. |

FIG. 9

RxPLP to TLP Interface Signals

| Name | Source | Width | Function |
| --- | --- | --- | --- |
| RP_Data_Q | RxPLP | 64 | Receive PLP output data bus. Received packet data eight bytes wide. |
| RP_HdrVal_Q | RxPLP | 1 | This strobe indicates that the header DW of a response packet is present. |
| RP_XHdrVal_Q | RxPLP | 1 | This strobe indicates that the extended header DW of a response packet is present. |
| TP_LAddr_Q | TLP | 44 | TLP local memory address bus. |
| TP_RspValid_Q | TLP | 1 | Indicates that the response is valid (the response has been authenticated) - output from the TLP |
| TP_ValidEnv_Q | TLP | 1 | Indicates the TP_RspValid_Q and TP_LAddr_Q signals are valid - output from the TLP |
| RP_PopTrns_Q | RxPLP | 1 | This strobe indicates that RxPLP has completed the current response packet without error. |

FIG. 12

RxPLP to TLP Interface Timing Diagram

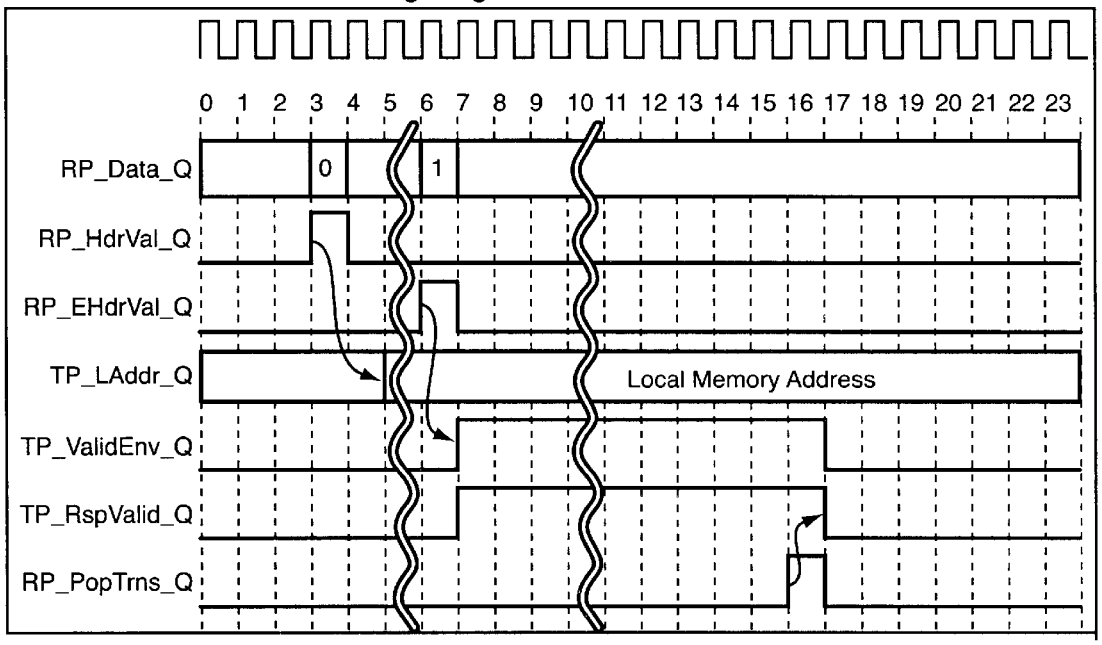

FIG. 13

RxPLP to TLP Interface Timing Diagram
FIG. 16

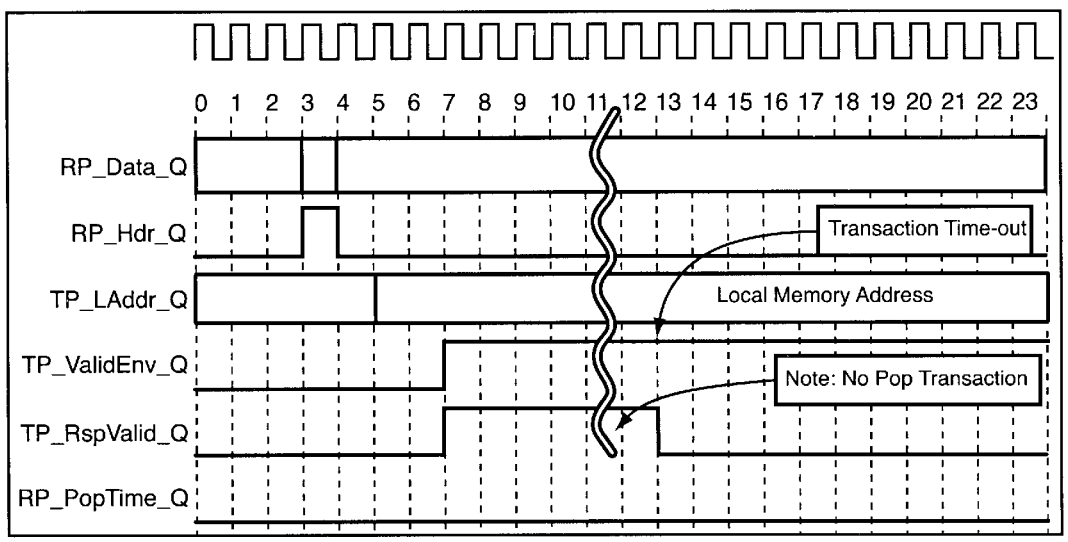

FIG. 17
TLP Transaction Time-out Interface Signals

| Name | Source | Width | Function |
|---|---|---|---|
| SNI_TOut_Valid_Q | TLP | 1 | Time-out bus are valid |
| SNI_TOut_TSN_Q | TLP | 6 | TSN of transaction being reported |
| SNI_TOut_CID_Q | TLP | 16 | Channel ID of transaction being reported |
| SNI_TOut_ACK_Q | SL | 3 | Session layer acknowledge of transaction time-out |

Transaction Time-out Example Timing Diagram
FIG. 18

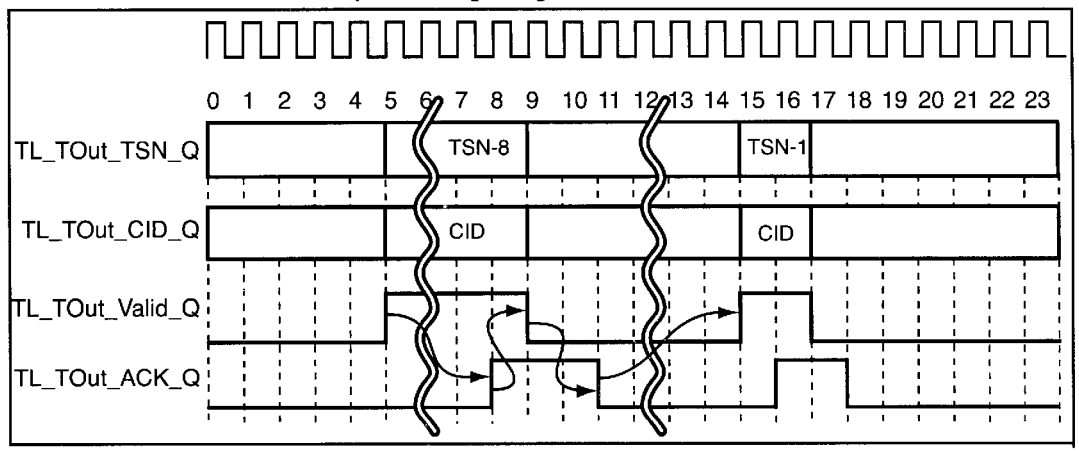

METHOD AND APPARATUS FOR TRACKING MULTI-THREADED SYSTEM AREA NETWORK (SAN) TRAFFIC

BACKGROUND OF THE INVENTION

1. Field of the Invention

The present invention relates generally to communication of information between nodes on a network and particular to tracking the status of independent transactions (multiple threads).

2. Description of the Relevant Art

One type of network is ServerNet developed by the assignee of the present application and described in detail in U.S. Pat. No. 5,675,807. ServerNet is an input/output (I/O) system area network system that provides redundant communication paths between various components of a large processing system, including a CPU and assorted peripheral devices (e.g., mass storage units, printers, and the like) of a sub-processing system, as well as between the sub-processors that may make up the larger overall processing system. Communication between any component of the processing system (e.g., a CPU and a another CPU, or a CPU and any peripheral device, regardless of which sub-processing system it may belong to) is implemented by forming and transmitting packetized messages that are routed from the transmitting or source component (e.g., a CPU) to a destination element (e.g., a peripheral device) by a system area network structure comprising a number of router elements that are interconnected by a bus structure (herein termed the "SNet") of a plurality of interconnecting links. The router elements are responsible for choosing the proper or available communication paths from a transmitting component of the processing system to a destination component based upon information contained in the message packet. Thus, the routing capability of the router elements provide the I/O system of the CPUs with a communication path to peripherals, but permits it to also be used for interprocessor communications.

ServerNet implements a technique of validating access to the memory of any end node, e.g., a CPU node or I/O node. The processing system, as structured according to the present invention, permits the memory of any CPU to be accessed by any other element of the system (i.e., other CPUs and peripheral devices). This being so, some method of protecting against inadvertent and/or unauthorized access must be provided. In accordance with this aspect of the invention, each CPU maintains an access validation and translation (AVT) table containing entries for each source external to the CPU that is authorized access to the memory of that CPU. Each such AVT table entry includes information as to the type of access permitted (e.g., a write to memory), and where in memory that access is permitted. Message packets that are routed through the network are created, as indicated above, with information describing the originator of the message packet, the destination of the message packet, what the message contains (e.g., data to be written at the destination, or a request for data to be read from the destination), and the like. In addition to permitting the router elements to route the message packet to its ultimate destination expeditiously, the receiving CPU uses the information to access the AVT table for the entry pertaining to the source of the message packet, and check to see if access is permitted, and if so what type and where the receiving CPU chooses to remap (i.e., translate) the address. In this manner the memory of any CPU is protected against errant accesses. The AVT table is also used for passing through interrupts to the CPU.

The AVT table assures that a CPUs memory is not corrupted by faulty I/O devices. Access rights can be granted from memory ranging in size from 1 byte to a range of pages. This fault containment is especially important in I/O, because the vendors of systems usually have much less control over the quality of hardware and software of third-party peripheral suppliers. Problems can be isolated to a single I/O device or controller rather than the entire I/O system.

In ServerNet, a block transfer engine (BTE) is provided in each CPU to handle input/output information transfers between a CPU and any other component of the processor system. Thereby, the individual processor units of the CPU are removed from the more mundane tasks of getting information from memory and out onto the SNet network, or accepting information from the network. The processor unit of the CPU merely sets up data structures in memory containing the data to be sent, accompanied by such other information as the desired destination, the amount of data and, if a response is required, where in memory the response is to be placed when received. When the processor unit completes the task of creating the data structure, the block transfer engine is notified to cause it to take over, and initiate sending of the data, in the form of message packets. If a response is expected, the block transfer engine sets up the necessary structure for handling the response, including where in memory the response will go. When and if the response is received, it is routed to the expected memory location identified, and notifies the processor unit that the response was received.

When the processors set up the BTE data structure, a transaction number (TN) is assigned to the request by a request transaction protocol layer and is included in the header field of the message packet that will be formed and sent by the BTE. Each transaction is a request-response pair. The processors will also include an memory address in the BTE data structure at which the data, when received, is to be placed. When the BTE logic sends the packet on its way, the memory address of the buffer location is written to a register file in the request transaction logic, using the TSN as a pointer into the register file.

When the response is received by the CPU, the request transaction logic will use the transaction number (TN) from the header at which the data contained in the incoming message packet is to be placed in the memory.

The resources used to generate SeverNet transactions on a CPU node are single-threaded. The resources, a block transfer engine (BTE) and a transaction-layer protocol checker (TLP) can source multiple active transactions, but they are single-threaded; that is, they are all related to a common descriptor. A new descriptor cannot start until the current descriptor has completed. In addition, the TLP requires all transaction responses to transaction requests to be received in the same order as they were sent out. As networks are required to perform at higher speeds and provide more bandwidth, improvements to single-threaded designs with restrictive ordering constraints will be required.

SUMMARY OF THE INVENTION

According to one aspect of the present invention, a network protocol provides multi-threaded transaction processing by keeping track of the status of a plurality of independent outstanding requests.

According to another aspect of the invention, time-out data for multiple independent transactions is maintained by a transaction layer protocol (TLP). A time-out of a transaction is utilized to invalidate the transaction.

According to a further aspect, each transaction request is described by a descriptor which includes a unique transaction number (TN) identifying the request. When a request is received by the transaction layer protocol the unique transaction number is used to set an active transition bit indexed by the TN.

According to a further aspect, a time-out value, included in a request descriptor, is stored when a request is received by the TLP, with the time-out value indexed by the unique TN of the request. A time out process periodically decrements each stored time-out value to keep track of the time elapsed for each outstanding independent request.

According to another aspect of the invention, each independent request may have a different time-out value stored in its descriptor.

Only those storage locations corresponding to requests having active transaction bits set are accessed by a time-out process. A stored time value is read, decremented, and, if the decremented time value is not equal to a predetermined value, written back to the storage location indexed by the TN of the active request.

According to another aspect of the invention, the request identified by a particular TN is inactivated if the time-out value indexed by the TN is decremented to the predetermined value.

According to another aspect of the invention, response authentication information for a request is stored when a request is received by the TLP, with the response authentication information indexed by the TN of the request.

During authentication, the TN included in a response is utilized to access stored authentication information. If the authentication information in the response header matches the stored authentication information then a transaction complete signal is asserted to indicate the transaction is complete.

According to another aspect of the invention, if a time-out occurs during response validation the TLP assures that the transaction either completes or times-out, not both.

According to one aspect of the invention, if a time-out occurs before the assertion of a transaction complete signal then the transaction is invalidated.

Other features and advantages of the invention will be apparent to persons of skill in the art in view of the following detailed description and appended drawings.

BRIEF DESCRIPTION OF THE DRAWINGS

FIG. 8 is table depicting the fields in a generic Request Transmit descriptor;

FIG. 9 is a table describing the signals of the TxPLP to TLP interface;

FIG. 12 is a table describing the signals of the RXPLP to TLP interface;

FIG. 13 is timing diagram of the RXPLP to TLP interface during authentication of a normal response;

FIGS. 14–16 are timing diagrams of the RXPLP to TLP interface depicting various time-out scenarios;

FIG. 17 is a table describing the signals of the time-out interface; and

FIG. 18 is a timing diagram of a transaction time-out.

DESCRIPTION OF THE PREFERRED EMBODIMENT

Figure 1:
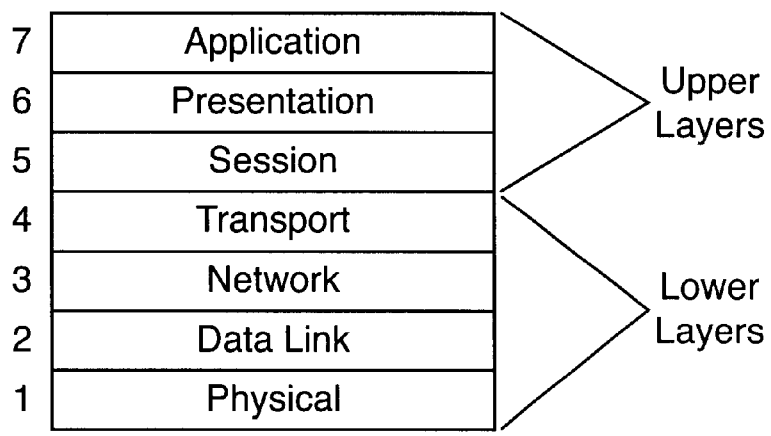
FIG. 1 is a block diagram of the layered protocol of OSI-RM.

A preferred embodiment of the invention will now be described in the context of a ServerNet layered protocol stack. Layered protocols for network communications are well known in the art. One example of a layered protocol is the Open Systems Interconnection Reference Model (OSI-RM) having the layered protocol depicted in FIG. 1. Typically the upper level of the layered protocol is application oriented and provide an application interface to the user. In the OSI-RM the upper level comprises the Application, Presentation, and Session layers. The lower level of the layered protocol is network oriented and provide for the packaging, routing verification, and transmitting and receiving data from the network.

Figure 2:
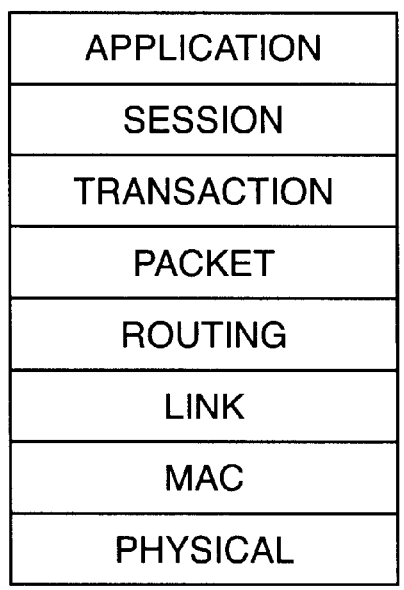
FIG. 2 is a block diagram of the layered protocol of a ServerNet host adapter.

FIG. 2 is a diagram of the layered protocol implemented in a host channel adapter having various interfaces and modules. The host channel adapter includes three primary layers of logic: the ServerNet stacks, the session layer modules, and the host side interface modules. These modules are depicted in FIG. 3.

Figure 3:
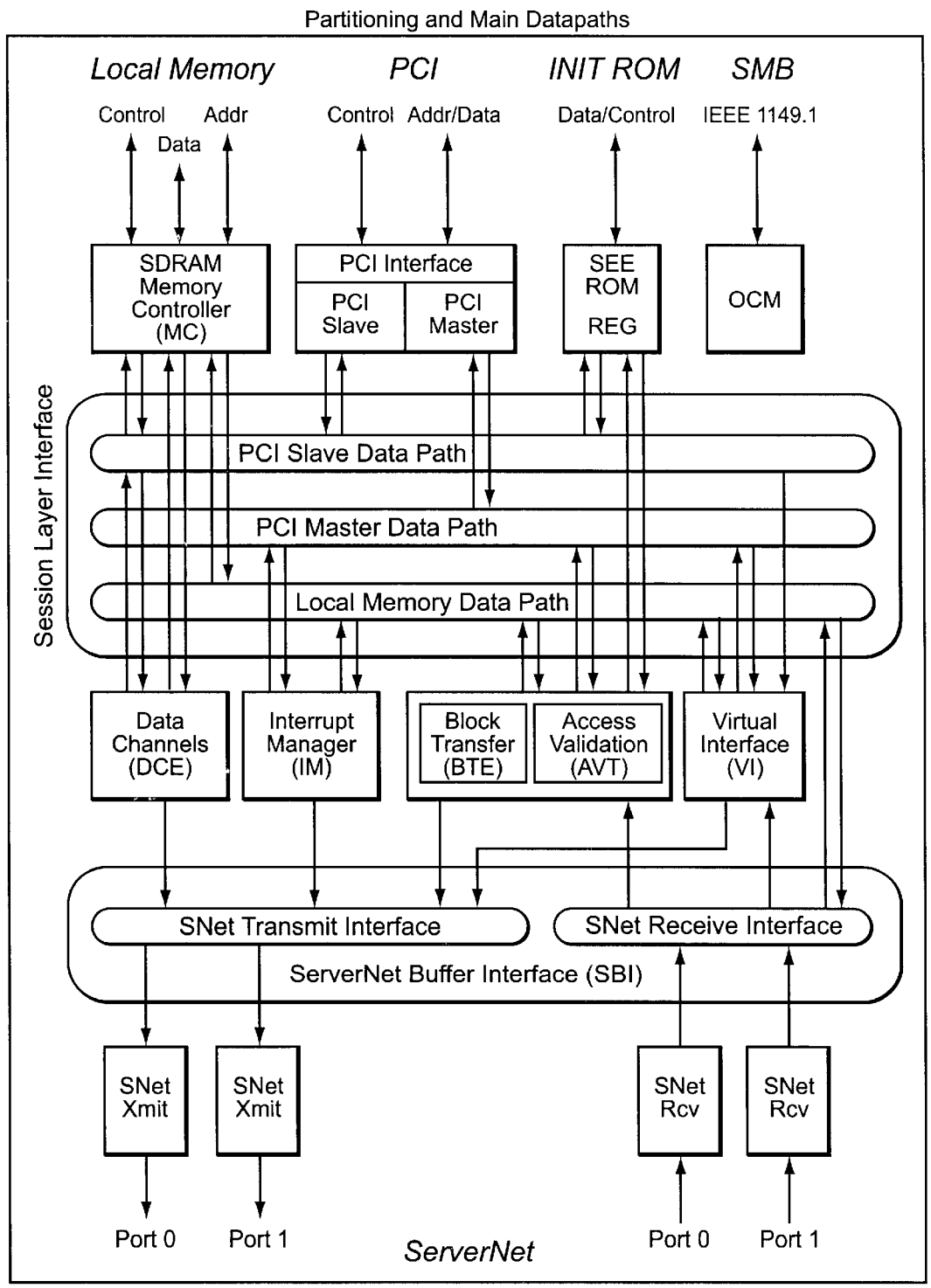
FIG. 3 is a block diagram depicting the modules and interfaces of a ServerNet host adapter.

The host side interfaces appear at the top of FIG. 3 and provide physical connections to host resources such as the PCI bus, local memory, etc. The session layer modules are in the center of FIG. 3 and are connected between the Session Layer Interface and the ServerNet Buffer Interface. The Session Layer provides the primary software interface and programming model and is the "datamover". The ServerNet stacks appear at the bottom of FIG. 3 and provide a connection to Servernet.

Returning to FIG. 2, all layers below the session layer are implemented in a hardware module denoted the ServerNet stack. The session layer modules respond to certain conditions created either by operating system software or by application software. This is typically in the form of software creating a data structure that will be interpreted by session layer devices as an instruction with the necessary information needed to move data from memory in the local node to the ServerNet stack in order to have the data transmitted onto the ServerNet network.

Each session layer module has its own specific software interface, though all share a common interface, denoted the ServerNet Buffer Interface (SBI), to the ServerNet stack. The session layer modules perform the necessary actions to create descriptors and place them in the ServerNet transmit buffers. These descriptors contain all the information necessary for the stack to transmit a packet on the ServerNet network.

The ASIC contains two independent ServerNet-II ports. Each port contains a transmit function and a receive function. The receive function of a port receives ServerNet request and response packets, creates inbound requests, and responses, and stores them in the port's receive buffer. The session layers modules read the request, and response packet descriptors from the receive buffer and processes them in accordance with ServerNet transaction level protocols (e.g. creating appropriate response packet descriptors for inbound requests).

Figure 4:
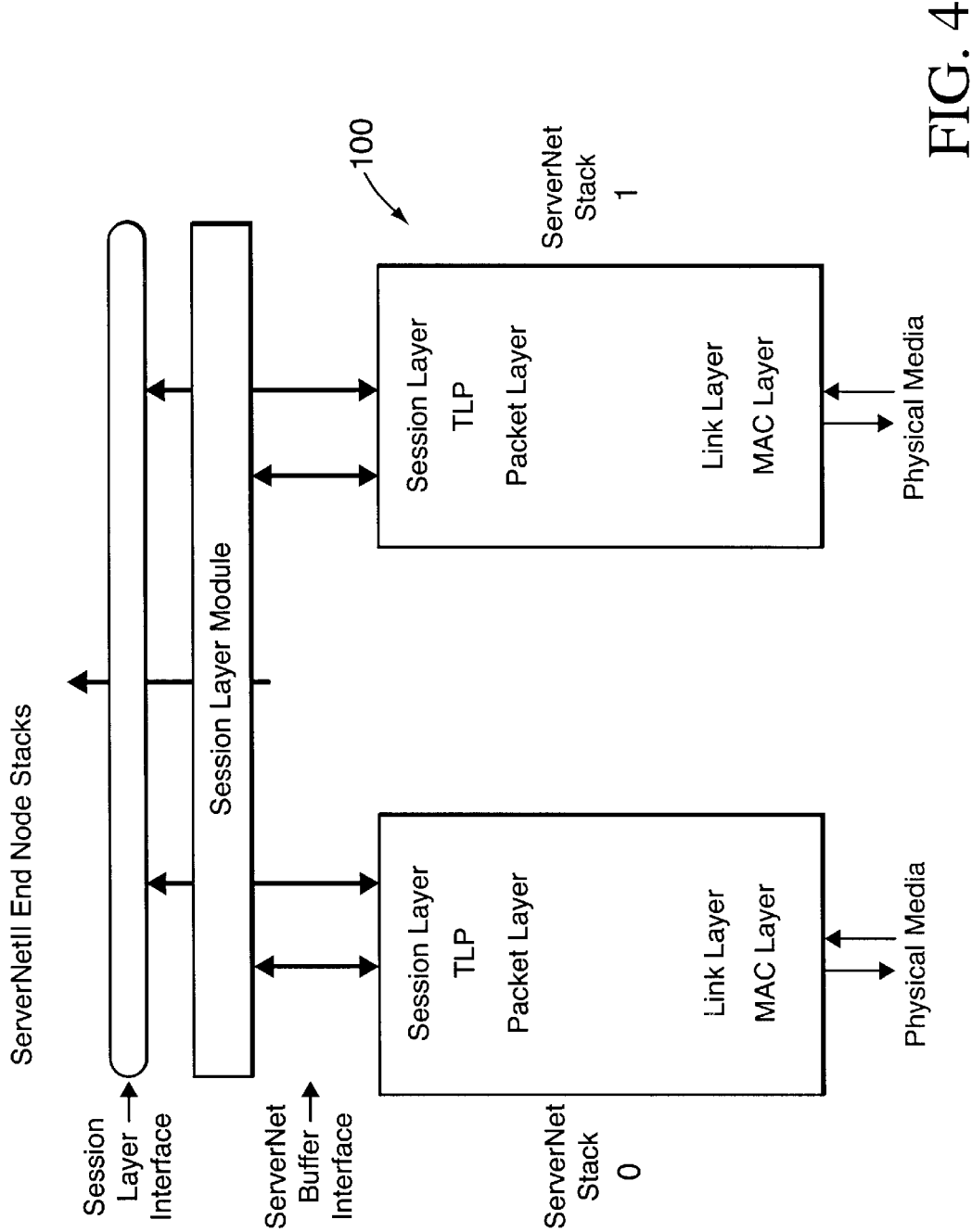
FIG. 4 is a block diagram of the end node protocol stacks.

FIG. 4 shows an example interface between a single session layer module and the ServerNet stacks. The actual interface is expanded to allow multiple session layer modules to arbitrate for access to ServerNet.

Figure 5:
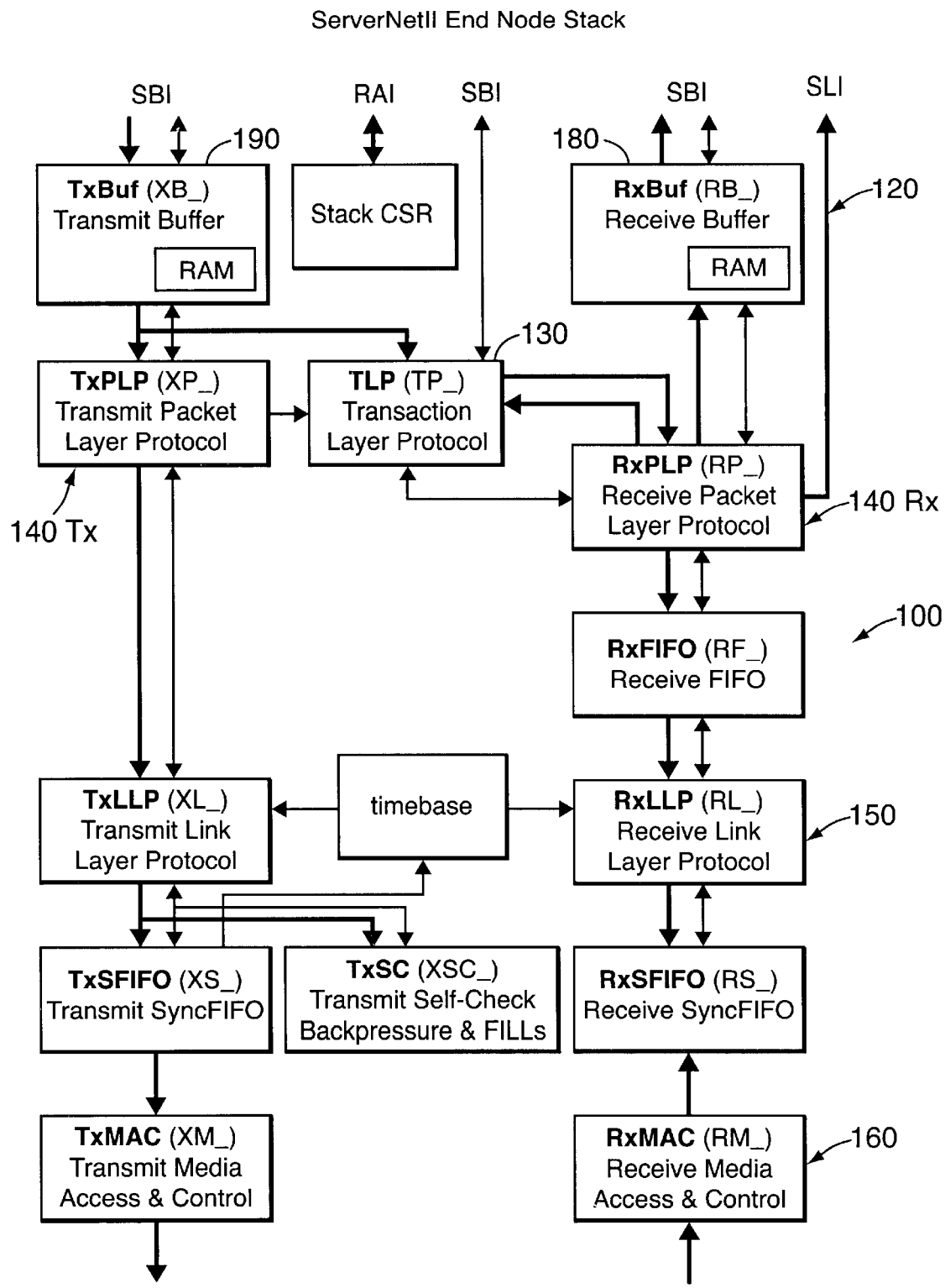
FIG. 5 is a more detailed block diagram of the end node protocol stacks.

FIG. 5 depicts the hardware implementation of a ServerNet End Node stack. The Stack Layer Interface uses the memory mnemonics "transmit" and "receive". The data flow from the SBI through to the ServerNet Physical link may be in either direction. Each stack is independent of the other one since they do not share any modules.

The lower level stack checks link level protocols and presents received data to the upper level stack. The upper level stack checks packet and transaction level protocols, and places packets into buffers, sorted by packet type. These packets, along with certain other information, comprise a packet descriptor.

The available types of packet descriptors are indicated to the session layer modules, which may select the type of descriptor they will work on next. The session layers arbitrate for the use of the buffers, and process the selected packet descriptors.

The stack depicted in FIG. 5 is modularized by protocol layers and each layer is built from several modules. The functions of these layers and modules are described in detail in below.

1) Buffer Layer

The Buffer layer contains the Transmit Buffer (TxBuf) and Receive Buffer (RxBuf) modules.

2) Transaction Protocol Layer

The transaction protocol layer is made of a single module, the Transaction Layer Protocol (TLP) module.

3) Packet Layer

The Packet layer contains the Transmit Packet (TxPLP) and Receive Packet (RxPLP) Protocol Layer modules.

4) Link Layer

Transmit Link Layer Protocol (TxLLP)

Receive Link Layer Protocol (RxLLP)

Receive FIFO (RxFIFO) Timebase module

Transmit Self-Check (TxSC)

5) Media Access and Control Layer (MAC)

Transmit Synchronous FIFO (TxSFIFO)

Receive Synchronous FIFO (RxSFIFO)

Transmit Media Access and Control (TxMAC)

Receive Media Access and Control (RxMAC)

The upper level of the ServerNet stack corresponds to the Transaction Level Protocol layer in FIG. 3. The functions of the modules in this layer will now be described.

The Receive Buffer supports the following:

1) Support for all SNet packet types, which are broadly characterized as read requests, write requests, read responses, and write responses 2) Support for ServerNet I, and VIA packet types 3) Three independent ports, two for AVT and one for VI, each with an 8 byte wide data path 4) Ability to start, abort, and restart processing of any buffer as many times as needed 5) Buffer model appears as random access memory to the session layer modules 6) Session layer modules control the flow of data 7) Support for early buffer unloading under the control of the session layer modules 8) Indications for each packet type for which at least 1 packet has been received.

9) A 256×64 dual-port RAM buffer for storing and retrieval of inbound ServerNet packet descriptors.

The Transmit Buffer Module provides the following features:

1. Arbitration Logic for the Session Layer Modules to gain ownership of the dual-port RAM buffers.

2. Arbitration Logic for the Session Layer Modules to gain ownership of the data and address buses.

3. A 256×64 dual-port RAM buffer for storing and retrieval of outbound ServerNet packet descriptors.

4. Required control to transfer data from the Session Layer Modules to packet descriptor RAM Buffers.

5. Required control to transfer data from the descriptor RAM Buffers to the Transmit Packet Layer Module.

The Packet Layer Protocol module provides the following primary features:

1) Translate between session layer packet descriptors and SNet packets.

2) Generate and check CRCs and packet terminators

3) Provide appropriately timed response strobes to the TLP

4) Timer Functions

Underrun Watchdog Timer

5) Support for Big and Little Endian formats and translations for the data payloads The Transaction Layer Protocol module provides the following primary features:

1) Response authentication

2) Independent timing for each active transaction

3) Local address storage for read response

4) Support of 24 active TSNs

The Link Layer Protocol modules provide the following primary features:

1) Check Link Layer Protocol

2) Encode and Decode packet data

3) Insert and Remove commands from the packet data stream

The Media Access Layer modules provide the following primary features:

1) Clock zone crossings

2) An interface to the physical media external to the chip

3) Auto Link configuration.

4) Data de-multiplexing (single symbol stream to a double wide stream)

5) SKIP symbol removal

6) Symbol packing for low speed ServerNet inputs (50 Mbyte/sec).

An overview of the Transaction Layer Protocol (TLP) will now be provided. TLP is responsible for tracking and timing transactions generated by the local-node and authenticating responses received by that node. Transactions are indexed and tracked using the Transaction Number (TN) which is transferred as part of all ServerNet packets. The ServerNet TN field allows a maximum of 64 unique transaction numbers. End-nodes may choose to support a smaller number of active transactions. The TNs are stored in a pool and can be assigned in any sequence. When a transaction request completes its TN is freed and returned to the pool.

The TLP module must be designed to allow for the easy adjustment of the number of TNs supported. Each TN supported must provide the same functionality; no assumption can be made concerning session layer use of a particular TN. The first use of the TLP module requires supported of 24 TNs. Specifically, TN 0 through TN 23 are supported and these TN numbers are used as indexes for the four logical RAMs.

Figure 6:
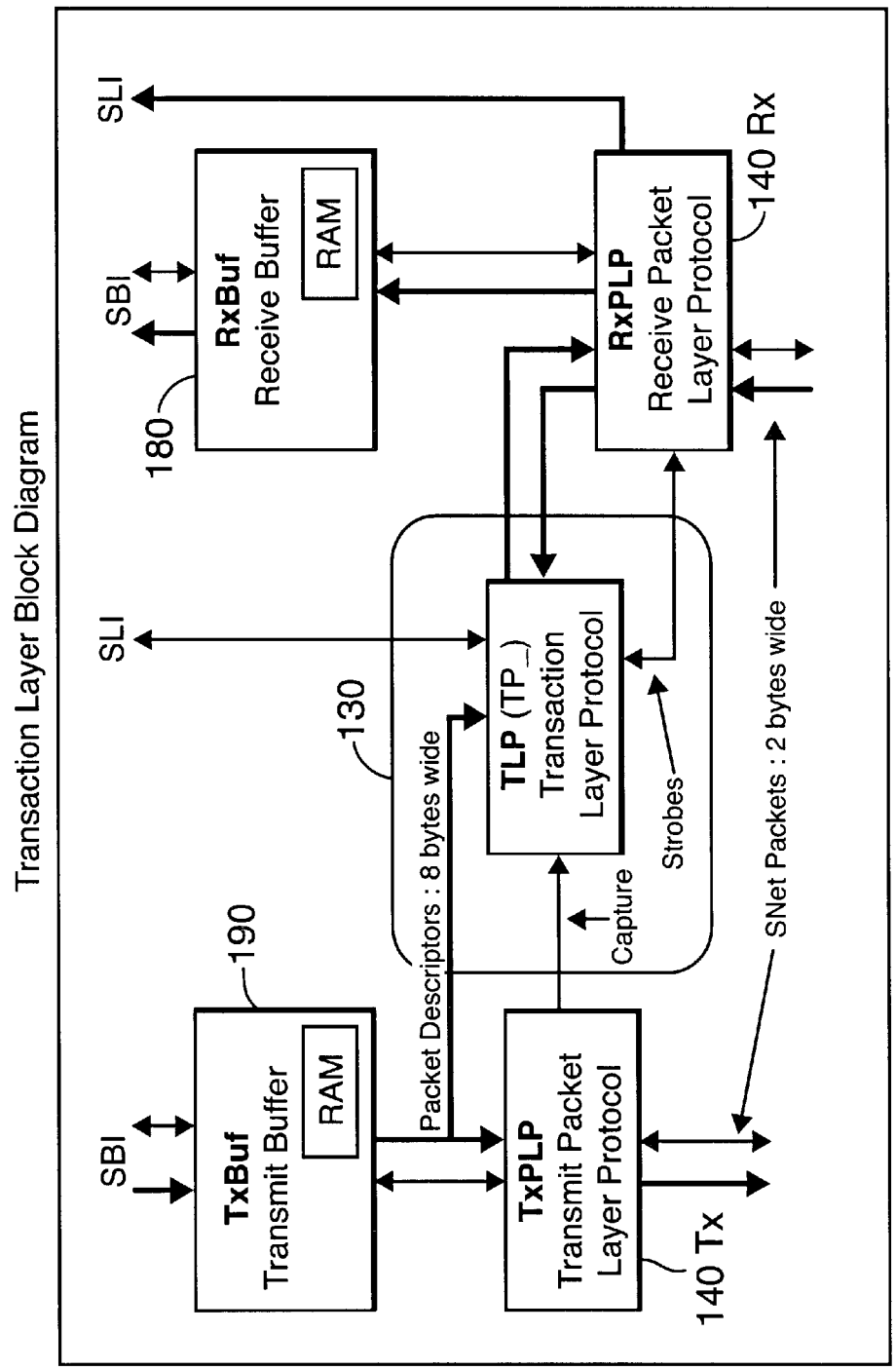
FIG. 6 is a block diagram of the transaction layer.

The TLP module receives requests and time-out information from the Transmit Packet Protocol module (TxPLP) and provides response authentication to the Receive Packet Layer Protocol module (RxPLP). Active transactions which do not receive a valid response before the time-out expires are reported as timed-out directly to the session layers. The block diagram in FIG. 6 shows the TLP module interfaces to other modules in the stack.

The Transaction Layer Protocol module tracks multiple transactions. Each transaction is tracked from creation to completion through the following three phases:

1) Transaction Start—Request transmission
2) Transaction Active—Delay pending valid response
3) Transaction Completion—Response authentication or transaction time-out.

The Transmit Packet Layer Protocol (TxPLP) module starts the transaction tracking process as it transmits the header of a request packet. Strobe signals from TxPLP indicates the availability of packet header information needed for tracking and timing. A final strobe from TxPLP indicates the completion of packet transmission; this marks the transaction as active, starting the packet time-out.

In the transaction active phase, the only activity occurring is time-out processing. Transaction timing is based on an externally generated 164 microsecond timing tick (t4). A state machine decrements the time-out value for each active transaction with every timer tick. When the time-out of an active TN goes to zero, that TN is marked inactive and reported to the session layer.

Normal transaction completions are handled by the Receive Packet Layer Protocol module which requests the TLP to authenticate responses as they are received. The RxPLP module generates strobe signals indicating that the response packet header is available for authentication. Transactions are authenticated by comparing selected fields from the response packet header to fields saved from the request header. Both ACK (acknowledge) and NACK (negative-acknowledge) are valid responses, though the packet header fields compared are different. If the TN specified by the response header is active and the required header fields match, TLP will report the response as authentic.

1) Transaction active
2) source & destination IDs match
3) packet types match
4) packet lengths align
5) If the packet received contains an extended header, the external headers match When the RxPLP has completed processing of the response packet and has checked the packet's CRC, a packet completion strobe is generated to stop time-out processing, completing the transaction. Active transactions which are not completed by RxPLP will remain active and eventually time-out.

Figure 7:
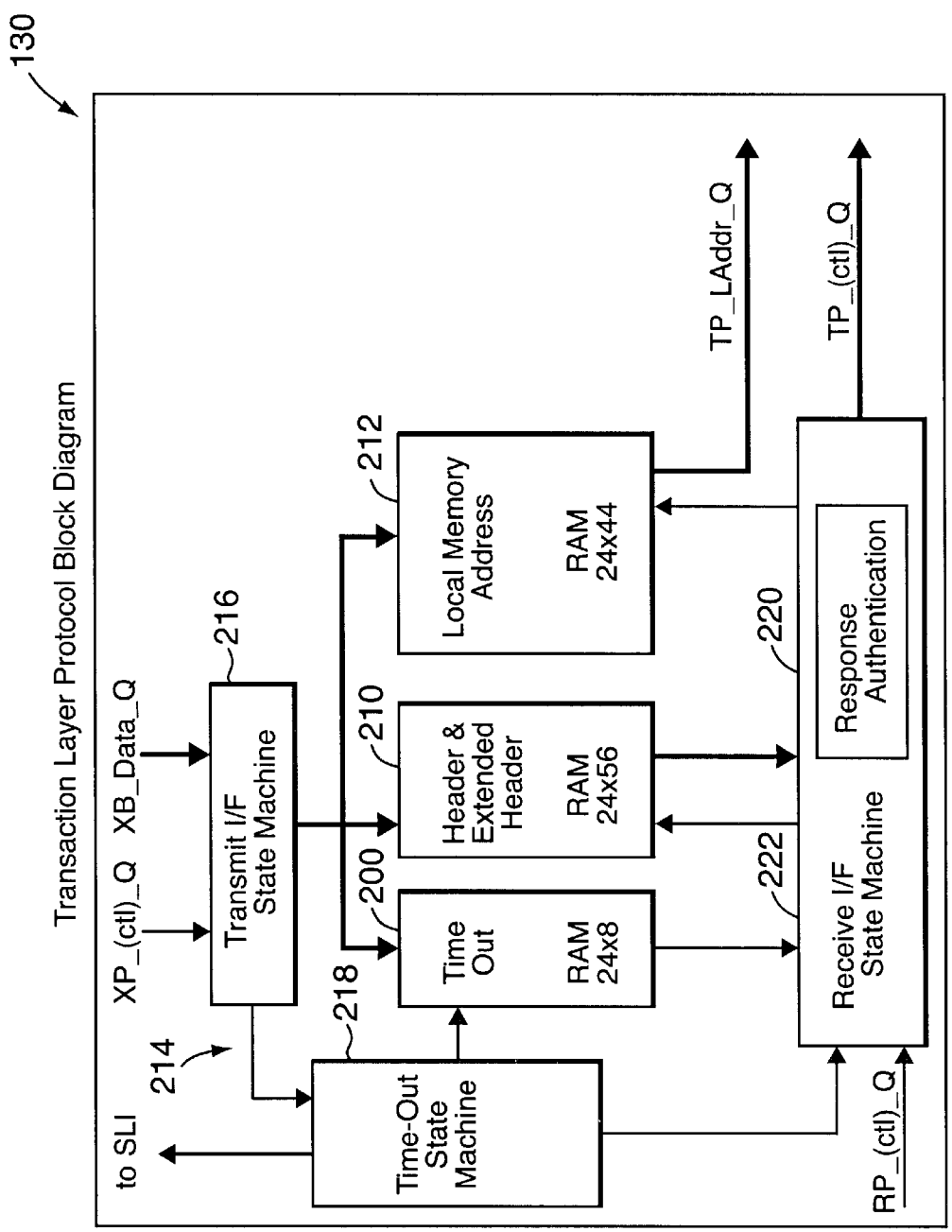
FIG. 7 is a block diagram of the transaction layer protocol module.

The Transaction Layer Protocol module block diagram (FIG. 7) shows RAM, sized to support 24 active transactions. The RAM is partitioned into a time out RAM 200 and an authentication information RAM. The authentication RAM is further divided into a header and extended header RAM 210 (which functions as two logical RAMs) and a Local Memory Address RAM 212 in this embodiment.

There are two control or state-machine blocks and four logical RAMs. The input and time-out control block 214 is the interface to TxPLP and tracks time-outs and includes the Transmit I/F State Machine 216 and the Time-Out State Machine 218. The response authentication block 220 interfaces to RXPLP and includes the Receive I/F state machine 222 and performs header comparisons for authentication. The four logical RAMs provide the following:

1) RAM 24×8—transaction time-out
2) RAM 24×56—header and extended header storage
3) RAM 24×44—local memory address storage.

A more detailed description of the interfaces between the various modules of the transaction layer protocol will now be described with reference to FIGS. 8–18.

TxPLP to TLP Interface

The interface between TxPLP and TLP is responsible for transaction start processing. When the TxPLP module processes a transmit descriptor, the double words of the descriptor are available to both the TxPLP and TLP. When the transmit descriptor presented by the transmit buffer is a request descriptor, strobes indicate the presence of information needed by the TLP. The general form for the transmit request descriptor is shown in FIG. 8.

The first double word of the request descriptor (offset 0) is used for all transaction types; the extended type field (offset 1) is used by type-7 transactions, and the local memory address field (offset 3) is needed for read requests. The ServerNet address field is not used by the TLP module. The extended type field and local memory address field are transaction type dependent and are not present for all request descriptors.

When TxPLP starts processing a new request descriptor it generates the XP_HdrVal_Q strobe to indicate that the first double word of the request descriptor is available to the TLP module. The TLP module will capture the following fields from the first double word:

1) DID[63:44]—20-bits response authenticate
2) Time-out[39:32]—8-bits transaction timing
3) Type[19:16]—4-bits response authenticate
4) TSN[12:8]—5-bits unique transaction identifier used to address RAM
5) Length[7:0]—8-bits response authenticate If the request being processed by TxPLP uses the extended type field, the module generates a XP_EHdrVal_Q strobe, indicating the double word with the extended type field is available. The TLP module captures three out of the first four bytes of the double word for response authentication. The fields it captures are:

1) XType[63:56]—8-bits response authenticate
2) XChannel ID[47:32]—16-bits response authenticate If the request being processed expects an ACK response to return data, a XP_LAddrVal_Q strobe is generated to indicate that the local memory address is available for capture. The local memory address is not used for response authentication. It is returned to the session layer with the authenticated ACK response. TLP captures bits 43:0 of the output of the transmit buffer when the address valid signal is asserted.

When TxPLP has completed processing the request descriptor and sent the This Packet Good (TPG) packet termination symbol, the XP_SentTPG_Q strobe is generated. This strobe allows TLP to begin time-out processing while awaiting trans-action completion. The table of FIG. 9 lists the signals that comprise the TxPLP to TLP interface.

Figure 10:
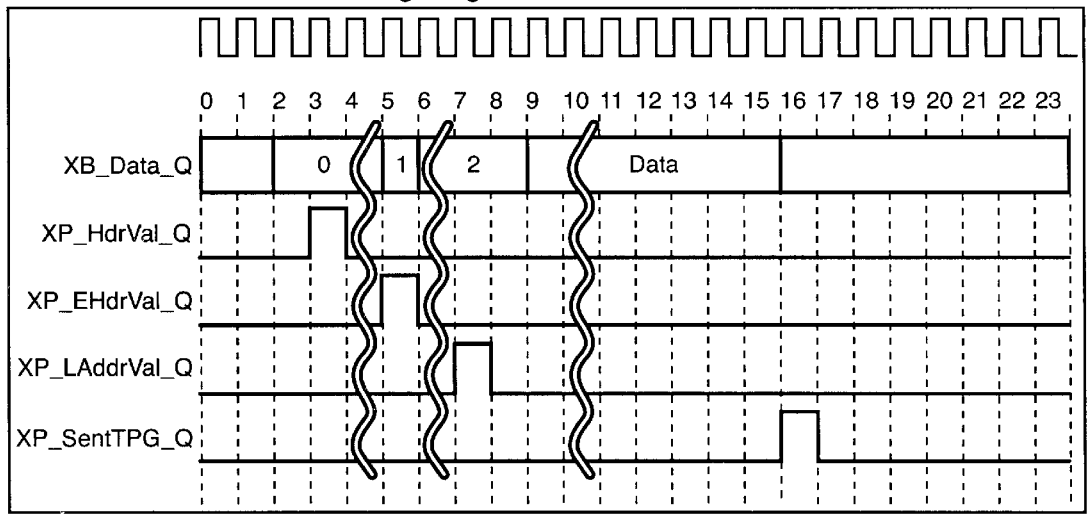
FIG. 10 is timing diagram of the TxPLP to TLP interface.

The interface timing diagram, FIG. 10, demonstrates the most complex version transaction start, needed by type-7 read transactions. Write transactions do not need a local memory address and will not generate the XP_LAddrVal_Q strobe. Transactions which do not use an extended type field will not generate the XP_EHdrVal_Q strobe. The minimum handshake for a sent transmission is the XP_HdrVal_Q, followed by the XP_SentTPG_Q (or XP_SentTPB_Q) when the transaction is complete.

The basic operation of the logic that interfaces to TxPLP is as follows:
1) Register header when TxPLP asserts the header valid signal
2) write time-out value to time-out RAM to address specified by TN of header; write header and extended header and local address while waiting for TxPLP to assert extended header valid, address valid, or one of the two termination signals.

RxPLP to TLP Interface

Figure 11:
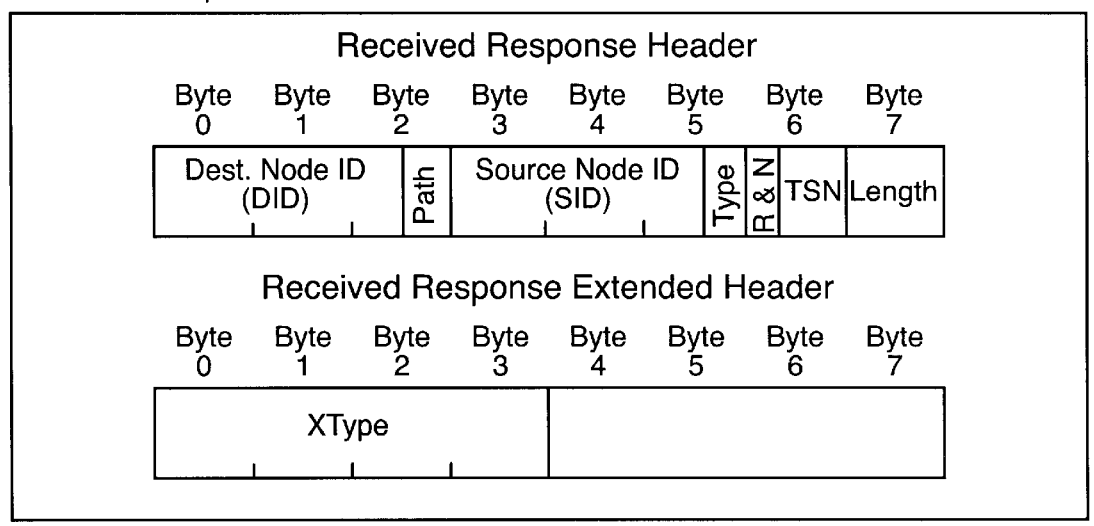
FIG. 11 is a block diagram depicting the Received Response Header format.

The interface between RXPLP and TLP is responsible for ACK and NACK transaction authentication. As the RxPLP module processes the incoming response packet the header and extended header are presented to the transaction layer protocol module for response authentication using data is saved at request transmission. If the transaction was not transmitted with an extended header the XHdr field is not checked. The double word formats of the receive header and extended header are shown in FIG. 11.

The authentication process begins when RxPLP indicates a valid response packet header is on the RP_Data_Q by asserting RP_HdrVal_Q strobe. TLP will drive the TL_LAddr_Q bus shortly (~2 clks) after receiving a TN in the response header. If the response has an extended header its presence on the RP_Data_Q is indicated by the RP_EHdrVal_Q strobe. When TLP has authenticated the response (ACK or NACK) TL_RspValid_Q is asserted. The response valid signal will remain asserted until RP_PopTrns_Q strobe is received, the transaction is timed out or another RP_HdrVal_Q strobe is received. The complete set of RxPLP to TLP interface signals is shown in the table of FIG. 12.

The interface timing diagram in FIG. 13 demonstrates the authentication of a normal extended header response. The local memory address is provided after receiving the TN the response.

Figure 14:
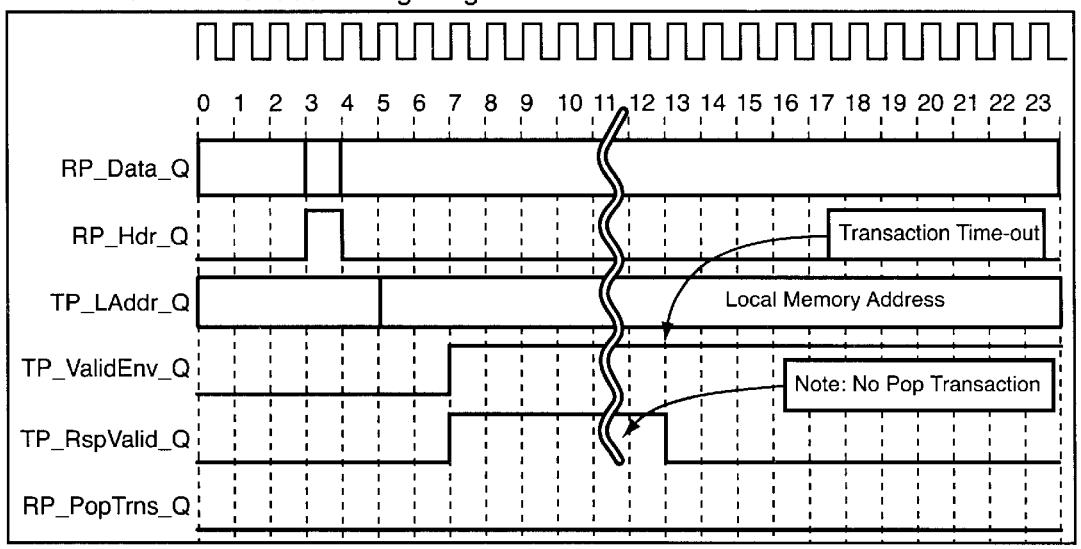
Figure 15:
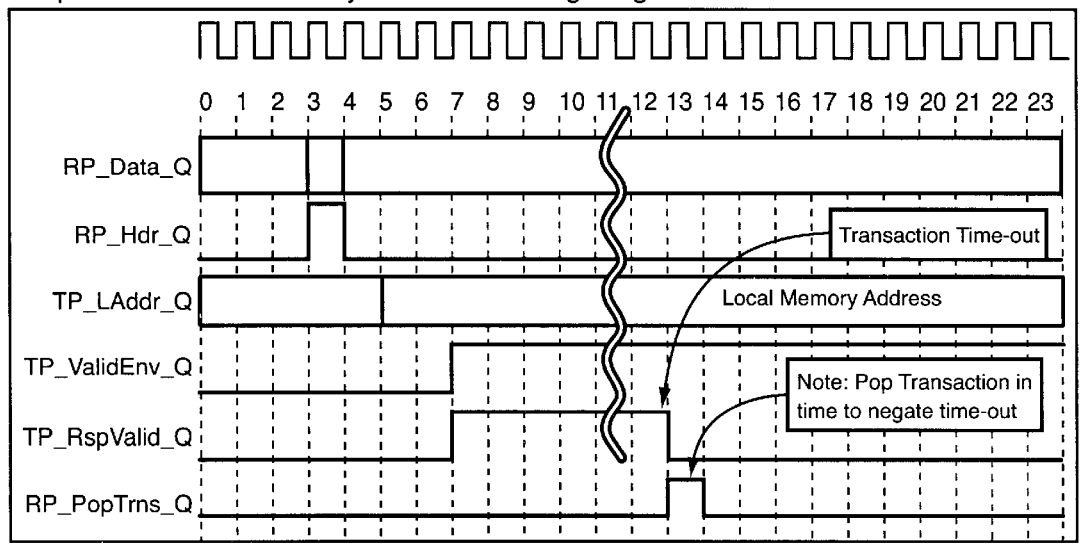

The timing diagram in FIG. 14 demonstrates the time-out for a transaction (with out extended header) after RxPLP has presented a valid response header. This type of interface timing could have been caused by a response with a CRC error or a transaction which timed-out before the last byte of the packet was received. The timing interaction between time-out and the PopTrns signal is depicted in FIGS. 15 and 16.

Transaction Time-out Interface

The transaction time-out interface is used to report trans-action time-outs to the session layer. When a transaction times out, TLP asserts SNI_TOut_Valid_Q and supplies the transactions TN and Channel ID (CID). The TN is used by the session layer requesters to identify the transaction being timed-out. The CID is used by session layer requester using extended header transaction types. The time-out interface signals are listed in the Table of FIG. 17.

Transaction Time-outs

When TLP logic detects a transaction time-out, the internal transaction active flag is cleared, the SNI_TOut_ TSN_Q and SNI_TOut_CID_Q busses are driven and SNI_TOut_Valid is asserted. SNI_TOut_Valid and SL_TOut_ACK_Q signals are used to implement a 4-edge handshake. The time-out of a second TN can be presented immediately following the completion of the handshake for the first TN. The time-out handshake for two TNs is shown in FIG. 18. Time-out accesses are always the lowest priority accesses to the time-out RAM.

Transmit Interface State Machine

The transmit interface state machine 216 is responsible for capturing the request header data and starting the time-out state machine 220 when the request TPG is transmitted. The following pseudo-code describes the processing required by this interface. The active flags are stored in bit arrays. These flags are available to all of the TLP state machines.

forever
  if (XP_HdrVal_Q)
    TrnsActive[TSN]=0 // clear transaction active flag
    EHdrActive[TSN]=0 // clear extended header active flag
    WriteTime[TSN]=time-out
    Save Hdr fields
    if (XP_EHdrVal_Q)
      Save EHdr fields
      EHdrActive[TSN]=1 // set extended header active flag
    if (XP_LAddrVal_Q) begin
      Save Local Address
    end if (XP_SentTPG_Q)
    WriteRAM[TSN]={Hdr, EHdr, LAddr}
    TrnsActive[TSN]=1 // set extended header active flag
// while The StartTime function use above request the time-out state machine 218 to load the time-out value and set the trans-action active bit for the specified TN. No unique boundary conditions have been identified.

The request to start transaction time-out must be posted to the time-out state machine 218 to allow the quick recycle of this interface; the next XP_HdrVal_Q strobe could occur with in two clocks of the XP_SentTPG_Q.

During design verification testing the following should be tested using a walking window test:
1) Timer tick (t4) and transaction start using type 0 and 1 request
2) Transaction start and transaction time-out report Time-out State Machine The time-out process tracks active transaction and reports timed-out transactions to the session layer. This is the sole owner of the 24×8 time-out; no other state machines have access to the memory. As a request is being transmitted, the transmit interface state machine 222 supplies the time-out value, allowing time for the time-out state to schedule the RAM write. The following pseudo-code describes the processing of the Time-out State Machine 218.

forever
  while (!t4) // idle loop check new transaction
    NewTrans
  for (i=0 to 23) begin // timer tick check time-out on all active transactions
    NewTrans
    if (TrnsActive[i])
      time=RAM_read[TSN]

```
NewTrans // function call
if (time !=0)
   time=time-1
else nop
if (time !=0)
   RAM_write[TNN]=time
else
   TrnsActive[i]=0 // clear transaction active flag
   if (RP_PopTrns & RP_TSN =1)
      nop // response received do not report
   else // report the time-out
      NewTrans
      Get CID from receive SM
      SNI_TOut_Valid<=1 // edge #1 of handshake
      SNI_TOut_TSN<=TSN
      SNI_TOut_CID<=CID
      while (!SL_TOut_ACK) begin // wait for edge
         #2
      NewTrans
      clk
      SNI_TOut_Valid<=0 // edge #3
      while (SL_TOut_ACK) // wait for edge #4
         NewTrans
         clk
```

For the normal case, transactions should complete long before their time-out expires. In some situations transaction time-out and transaction completion can occur on or near the same clock. When this occurs, the transaction must complete or time-out; it is not acceptable for at transaction to both time-out and complete.

When a new transaction starts, priority is given to the memory write to update time-out memory. Time-out processing and time-out reporting are interrupted while the new time-out value is written to memory. Time-out processing and reporting are the lowest priority active; this state machine 218 may need to wait while the receive interface state machine 222 processes response authentications. In high work load conditions (multiple transaction time-outs), it is acceptable of time-out state machine 218 to lose timer ticks and not decrement the active time-out values.

Receive Interface State Machine

The receive interface state machine 222 controls the read interface header, extended header, and local memory address RAMs. The state machine 222 is responsible for response authentication and extended header read requested by the time-out state machine 218. The following pseudo-code describes the receive interface state machine 222. The following pseudo-code describes the processing of the Receive Interface State Machine 222.

```
forever
if (RP_HdrVal_Q)
   TP_RspValid_Q<=0
   v_ram=RAN_read[TSN] Hdr, EHdr and LAddr RAMs
   V_eq_path=(Path[3:1]==V_path)
   V_eq_sid=(Sid[19:0]==V_did)
   V_eq_type=(Type[3:0]==V_type)
   V_eq_length=(Nak|Length==V_length)
   V_eq_ehdr=(~ehdr_flag|(Ehdr_flag & Ehdr==V_
      ehdr))

V_authentic=(Trnsactive[Tsn] & V_eq_path & V_eq_
      sid & V_eq_type & & V_eq_length)
   if (!EHdrActive[TSN] & v_authentic)
      TP_RspValid_Q<=1
   else nop
else nop
   if (RP_EHdrVal_Q)
      v_EQ_EHdr=(EHdr==v_EHdr)
      if (EHdrActive[TSN] & v_EQ_EHdr & v_authentic)
         TP_RspValid_Q<=1
   else nop
else nop
if (RP_PopTrns)
   if (TP_RspValid)
      TrnsActive[TSN]<=0
   else nop
else nop
service time-out read
function service time-out read // read CID from extended
   header ram
   v_CID=RAM_Read[toutTSN]EHdr
   clk
```

There are no boundary conditions unique to the receive interface state machine 222. The response and time-out boundary condition is covered by the time-out state machine 218.

The time allowed for the read compare operation following RP_HdrVal_Q is two clocks. This requirement is driven by the need to authenticate write response packets. The same time requirements apply to responses with extended headers. Only two clocks are allowed following RP_EHdrVal_Q.

The invention has now been described with reference to the preferred embodiments. Alternatives and substitutions will now be apparent to persons of skill in the art. For example, the invention has been described with reference to ServerNet. However, the principles of the invention are applicable to any network that transfers information in packets or is transaction-based. Further, although many functions have been implemented in hardware in the preferred embodiments those of skill in the art could substitute software instead. In particular, the various state machine functions may be implemented in hardware and software. The particular interface signal and handshakes may be modified within the scope of the invention. Additionally, in the preferred embodiment the number of TNs is limited to 64 because of the size of the field used for the TNs. This number is arbitrary and can be varied as understood by persons of skill in the art. Accordingly, it is not intended to limit the invention except as provided by the appended claims.

What is claimed is:

1. In a layered protocol stack for performing packet receive and transmit functions, and with each transaction described by a transaction descriptor including a unique transaction number (TN), and with the transaction descriptor also including authentication information, with the layered protocol stack having a transaction protocol module comprising:

a time-out memory having storage locations indexed by said TNs of independent transaction requests;

an authentication information memory having storage locations indexed by said TNs of independent transaction requests;

a transmit interface state machine, coupled to receive a request descriptor of an independent transaction request and coupled to the inputs of said authentication information memory, for asserting control signals to store authentication information of a received request descriptor in a storage location of the authentication information memory indexed by the TN included in the received request descriptor, for setting a transaction active bit, corresponding to the TN of the received transaction request, and for asserting a timeout start signal;

a time-out state machine, coupled to the transmit interface state machine and time-out memory, for storing a time-out value in the storage location of the time-out memory indexed by the TN of the received transaction descriptor when said time-out start signal is asserted, and for periodically decrementing all time-out values indexed by TNs of a plurality of set transaction active bits indicating independent active transaction requests, and for asserting a time-out signal to invalidate an independent transaction request identified by a TN indexing a storage location having a time-out value decremented to a predetermined value; and a receive interface state machine, for reading authentication information from the storage location in the authentication information memory indexed by a TN included in a response packet responding to an active transaction request, and for completing the active transaction indexed by an included TN if matching of authentication information read from the authentication memory and authentication information included in the response packet is completed prior to the assertion of the time-out signal for the included TN of the received response descriptor.

2. The module of claim 1 where each independent transaction request descriptor includes a time-out value so that different requests may have different time-out values.

3. A method for multi-threaded transaction processing, with each transaction request descriptor including a unique transaction number (TN) and authentication information, said method comprising the steps of:

utilizing the TNs of independent transaction request to concurrently maintain the elapsed time from the receipt of each independent transaction request;

utilizing the TNs in response headers of independent active transaction requests to authenticate responses to active transaction requests; and utilizing the TNs to inactivate any independent active transaction request when the elapsed time for the transaction request exceeds a predetermined value prior to authentication of a response to the active transaction request.

4. In a layered protocol stack for performing packet receive and transmit functions, with each transaction described by a transaction descriptor including a unique transaction number (TN), and with the transaction descriptor also including authentication information, a method for performing a transaction protocol comprising the steps of:

providing a time-out memory having storage locations indexed by TNs of independent transaction requests;

providing an authentication information memory having storage locations indexed by TNs of independent transaction requests;

asserting control signals to store authentication information of a received transaction request descriptor in a storage location of the authentication information memory indexed by the TN included in the received transaction request descriptor, and setting a transaction active bit, corresponding to the TN of the received transaction request, and asserting a time-out start signal;

storing a time-out value in the storage location of the time-out memory indexed by the TN of the received request transaction descriptor when said time-out start signal is asserted, and periodically decrementing all time-out values indexed by TNs a plurality of set transaction active bits corresponding to independent active transaction requests, and asserting a time-out signal to invalidate a transaction identified by a TN indexing a storage location having a timeout value decremented to a predetermined value; and reading authentication information from the storage location in the authentication information memory indexed by a TN included in a response packet responding to the received transaction request, and completing the received transaction request if matching of authentication information read from the authentication memory and authentication information included in the response packet is completed prior to the assertion of the time-out signal for the TN of the received transaction packet.

* * * * *

UNITED STATES PATENT AND TRADEMARK OFFICE
CERTIFICATE OF CORRECTION

PATENT NO. : 6,374,282 B1
DATED : April 16, 2002
INVENTOR(S) : Bunton et al.

It is certified that error appears in the above-identified patent and that said Letters Patent is hereby corrected as shown below:

Column 1,
Line 7, reads "of information between nodes on a network and particular to" it should read -- of information between nodes on a network and in particular to --;
Line 35, reads "provide the I/O system of the CPUs with a communication" it should read -- provides the I/O system of the CPUs with a communication --.

Column 2,
Line 1, reads "The AVT table assures that CPUs memory is not" it should read -- The AVT table assures that CPU's memory is not --;
Line 36, "The processors will also include an memory address in the" it should read -- The processors will also include a memory address in the --;
Line 40, "file in the request transaction logic, using the TSN as a" it should read -- file in the request transaction logic, using the TN as a --.

Column 4,
Line 3, reads "FIG. 12 is a table describing the signals of the RXPLP to" it should read -- FIG. 12 is a table describing the signals of the RxPLP to --;
Line 5, reads "FIG. 13 is a timing diagram of the RXPLP to TLP interface" it should read -- FIG. 13 is a timing diagram of the RxPLP to TLP interface --;
Line 7, reads "FIGS. 14-16 are timing diagrams of the RXPLP to TLP" it should read -- FIGS. 14-16 are timing diagrams of the RxPLP to TLP --;

Column 5,
Line 2, reads "descriptors from the receive buffer and processes them in" it should read -- descriptors from the receive buffer and process them in --;
Line 31, reads "in below." it should read -- below. --.

Column 7,
Line 5, reads "TN. The first use of the TLP module requires supported of" it should read -- TN. The first use of the TLP module requires support of --.

Column 9,
Line 1, reads "while awaiting trans-action completion. The table of FIG. 9" it should read -- while awaiting transaction completion. The table of FIG. 9 --;
Line 21, reads "The interface between RXPLP and TLP is responsible for" it should read -- The interface between RxPLP and TLP is responsible for --;
Line 25, reads "protocol module for response authentication using data is" it should read -- protocol module for response authentication using data --;
Line 46, reads "local memory address is provided after receiving the TN the" it should read -- local memory address is provided after receiving the TN for the --.

UNITED STATES PATENT AND TRADEMARK OFFICE
CERTIFICATE OF CORRECTION

PATENT NO. : 6,374,282 B1
DATED : April 16, 2002
INVENTOR(S) : Bunton et al.

It is certified that error appears in the above-identified patent and that said Letters Patent is hereby corrected as shown below:

Column 10,
Line 37, reads " The StartTime function use above request the time-out" it should read
-- The StartTime function used above requests the time-out --;
Line 39, reads "trans-action active bit for the specified TN. No unique" it should read
-- transaction active bit for the specified TN. No unique --;
Line 44, reads "with in two clocks of the XP_SentTPG_Q." it should read
-- within two clocks of the XP_SentTPG_Q. --.

Column 11,
Line 39, reads "it is acceptable of time-out state machine 218 to lose timer" it should read -- it is acceptable for time-out state machine 218 to lose timer --;
Line 64, reads "sid & V_eq_type & & V_eq_length)" it should read
-- sid & V_eq_type & V_eq_length) --.

Signed and Sealed this

Twenty-eighth Day of January, 2003

JAMES E. ROGAN
*Director of the United States Patent and Trademark Office*